(12) United States Patent
Yamanouchi

(10) Patent No.: US 12,307,578 B2
(45) Date of Patent: May 20, 2025

(54) TRAFFIC EVENT REPRODUCTION SYSTEM, SERVER, TRAFFIC EVENT REPRODUCTION METHOD, AND NON-TRANSITORY COMPUTER READABLE MEDIUM

(71) Applicant: NEC Corporation, Tokyo (JP)

(72) Inventor: Masahiro Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 18/037,919

(22) PCT Filed: Nov. 25, 2020

(86) PCT No.: PCT/JP2020/043789
§ 371 (c)(1),
(2) Date: May 19, 2023

(87) PCT Pub. No.: WO2022/113196
PCT Pub. Date: Jun. 2, 2022

(65) Prior Publication Data
US 2024/0013476 A1    Jan. 11, 2024

(51) Int. Cl.
*G06T 15/10* (2011.01)
*G06T 15/04* (2011.01)
(Continued)

(52) U.S. Cl.
CPC .............. *G06T 15/10* (2013.01); *G06T 15/04* (2013.01); *G06T 17/00* (2013.01); *G08G 1/04* (2013.01);
(Continued)

(58) Field of Classification Search
CPC ......... G06T 15/10; G06T 15/04; G06T 17/00; G06T 2200/24; G06T 2210/56; G08G 1/04; G06V 20/54; G06V 20/44
See application file for complete search history.

(56) References Cited

U.S. PATENT DOCUMENTS

| 10,825,191 | B2 * | 11/2020 | Kataoka ............... G06V 10/255 |
| 11,308,741 | B1 * | 4/2022 | Cardona .............. G08G 1/0137 |
| 11,710,278 | B2 * | 7/2023 | Kozloski ................. G06T 19/20 |
| | | | 345/426 |
| 11,934,746 | B2 * | 3/2024 | Yamanouchi .......... G08G 1/205 |

(Continued)

FOREIGN PATENT DOCUMENTS

| EP | 3211596 A1 * | 8/2017 | ......... G06K 9/00711 |
| JP | 2012128734 A * | 7/2012 | ......... G06K 9/00711 |

(Continued)

OTHER PUBLICATIONS

International Search Report for PCT Application No. PCT/JP2020/043789, mailed on Jan. 26, 2021.

*Primary Examiner* — Chico A Foxx

(57) ABSTRACT

A traffic event reproduction system according to the present procedure includes: a server; a first transmission apparatus configured to transmit first event information including a first event video to the server; a second transmission apparatus configured to transmit second event information including a second event video to the server. A server includes: a reception unit configured to receive first and second event information; a model generation unit configured to generate first and second three-dimensional models including a party to a traffic event extracted from the first and second event videos as an object; a combining unit configured to combine the first and second three-dimensional models to generate a combined three-dimensional model in a three-dimensional space; and a display unit configured to display a video viewed from a user-specified viewpoint using the combined three-dimensional model.

11 Claims, 10 Drawing Sheets

(51) Int. Cl.
  *G06T 17/00* (2006.01)
  *G08G 1/04* (2006.01)
  *G06V 20/40* (2022.01)
  *G06V 20/54* (2022.01)

(52) U.S. Cl.
  CPC ...... *G06T 2200/24* (2013.01); *G06T 2210/56* (2013.01); *G06V 20/44* (2022.01); *G06V 20/54* (2022.01)

(56) References Cited

U.S. PATENT DOCUMENTS

| | | | |
|---|---|---|---|
| 2015/0029308 A1* | 1/2015 | Han | G08G 1/0112 348/43 |
| 2015/0202939 A1* | 7/2015 | Stettner | B60R 21/013 701/45 |
| 2019/0193659 A1 | 6/2019 | Miyazawa et al. | |
| 2020/0372791 A1* | 11/2020 | Li | G06V 20/597 |
| 2022/0058845 A1* | 2/2022 | Davis | G06T 11/60 |
| 2022/0139217 A1* | 5/2022 | Lin | G06V 20/52 340/937 |
| 2022/0189297 A1* | 6/2022 | Lin | G08G 1/056 |

FOREIGN PATENT DOCUMENTS

| | | | | |
|---|---|---|---|---|
| JP | 2020187762 A | * | 11/2020 | ............ B60K 35/00 |
| KR | 835085 B1 | * | 6/2008 | |
| KR | 20160000556 A | * | 1/2016 | |
| WO | WO-02056275 A1 | * | 7/2002 | ........... G08G 1/0175 |
| WO | WO-2015106320 A1 | * | 7/2015 | ............ G06T 15/00 |
| WO | 2018/008122 A1 | | 1/2018 | |

\* cited by examiner

TRAFFIC EVENT REPRODUCTION SYSTEM, SERVER, TRAFFIC EVENT REPRODUCTION METHOD, AND NON-TRANSITORY COMPUTER READABLE MEDIUM

This application is a National Stage Entry of PCT/JP2020/043789 filed on Nov. 25, 2020, the contents of all of which are incorporated herein by reference, in their entirety.

TECHNICAL FIELD

The present disclosure relates to a traffic event reproduction system, a server, a traffic event reproduction method, and a non-transitory computer readable medium.

BACKGROUND ART

Traffic accidents such as collisions between vehicles may occur on roads. In addition, events (for example, near misses) may occur that do not result in a traffic accident but are likely to result in a traffic accident. Parties who have encountered a traffic accident or an event that is likely case a traffic accident (hereinafter referred to as "traffic event" or simply "event") may need to objectively grasp the situation at the time of occurrence of the traffic event. For example, in the event of a collision accident, the parties to the accident must objectively prove their share of responsibility. However, it is difficult for the parties to the accident to objectively prove the situation at the time of the accident. In recent years, the installation rate of video recording apparatuses such as drive recorders, which store videos at the time of occurrence of traffic events including accidents, in vehicles has been increasing.

As a related art, for example, Patent Literature 1 discloses an accident information collection system that collects a video from a camera installed in a vehicle at the time of an accident. In the accident information collection system described in Patent Literature 1, the information center apparatus receives, from a vehicle, a video and position information of an accident that occurred in or in the vicinity of the vehicle. The information center apparatus receives videos and position information of the accident from vehicles in the vicinity of the accident site. The information center apparatus generates a video showing an accident temporally or spatially continuously on the basis of the video of the same accident site.

In generating the video showing the accident, the information center apparatus extracts the frame images at the time when each vehicle reaches the same point. The information center apparatus generates a pseudo fixed point monitoring image by arranging the frame images of the accident site captured at the same point, which are extracted from the videos of a plurality of vehicles, in chronological order. In generating the pseudo fixed point monitoring image, the information center apparatus matches feature points between the frame images and corrects the position of the images so that the positional relationship between the feature points is correct. Patent Literature 1 also describes that the information center apparatus extracts a plurality of frame images at the same time from a plurality of accident information videos, and spatially connects the extracted frame images to combine the frame images.

CITATION LIST

Patent Literature

Patent Literature 1: International Patent Publication No. WO2018/008122

SUMMARY OF INVENTION

Technical Problem

Although the technology described in Patent Literature 1 allows the user to observe the video images taken from the viewpoint of each vehicle separately, this observation method makes it difficult to objectively grasp the overview of a traffic event including an accident.

Patent Literature 1 also discloses a technique of acquiring a pseudo fixed-point surveillance video on the basis of a plurality of videos of the same accident. However, even with this method, the site of a traffic event can only be observed from a certain direction, and for example, the situation of a traffic event cannot be observed for areas that are blind spots from a fixed point. Therefore, it is still difficult to objectively grasp the overview of an accident.

In view of the above-described problems, an object of the present disclosure is to provide a traffic event reproduction system, a server, a traffic event reproduction method, and a non-transitory computer readable medium that allow objective grasp of an overview of a traffic event.

Solution to Problem

A traffic event reproduction system according to the present disclosure includes:
a server;
a first transmission apparatus configured to transmit first event information including a first event video of a traffic event to the server; and
a second transmission apparatus configured to transmit second event information including a second event video of the traffic event to the server,
the server includes:
reception means for receiving the first event information and the second event information from the first transmission apparatus and the second transmission apparatus;
model generation means for generating a first three-dimensional model including a party to the traffic event extracted from the first event video as an object and a second three-dimensional model including the party extracted from the second event video as an object;
combining means for combining the first three-dimensional model and the second three-dimensional model to generate a combined three-dimensional model in a three-dimensional space including a point corresponding to the occurrence point of the traffic event; and
display means for displaying a video of the party viewed from a user-specified viewpoint using the combined three-dimensional model.

A server according to the present disclosure includes:
reception means for receiving first event information including a first event video of a traffic event from a first transmission apparatus, and receiving second event information including a second event video from a second transmission apparatus;
model generation means for generating a first three-dimensional model including a party to the traffic event extracted from the first event video as an object and a second three-dimensional model including the party extracted from the second event video as an object;

combining means for combining the first three-dimensional model and the second three-dimensional model to generate a combined three-dimensional model in a three-dimensional space including a point corresponding to the occurrence point of the traffic event; and display means for displaying a video of the party viewed from a user-specified viewpoint using the combined three-dimensional model.

A traffic event reproduction method according to the present disclosure includes:

receiving first event information including a first event video of a traffic event from a first transmission apparatus, and receiving second event information including a second event video from a second transmission apparatus;

generating a first three-dimensional model including a party to the traffic event extracted from the first event video as an object and a second three-dimensional model including the party extracted from the second event video as an object;

combining the first three-dimensional model and the second three-dimensional model to generate a combined three-dimensional model in a three-dimensional space including a point corresponding to the occurrence point of the traffic event; and displaying a video of the party viewed from a user-specified viewpoint using the combined three-dimensional model.

A non-transitory computer readable medium storing a traffic event reproduction program according to the present disclosure causes a computer to execute:

a reception process of receiving first event information including a first event video of a traffic event from a first transmission apparatus, and receiving second event information including a second event video from a second transmission apparatus;

a model generation process of generating a first three-dimensional model including a party to the traffic event extracted from the first event video as an object and a second three-dimensional model including the party extracted from the second event video as an object;

a combining process of combining the first three-dimensional model and the second three-dimensional model to generate a combined three-dimensional model in a three-dimensional space including a point corresponding to the occurrence point of the traffic event; and a display process of displaying a video of the party viewed from a user-specified viewpoint using the combined three-dimensional model.

Advantageous Effects of Invention

The traffic event reproduction system, server, traffic event reproduction method, and non-transitory computer readable medium according to the present disclosure allow a user to objectively grasp an overview of a traffic event.

EXAMPLE EMBODIMENT

First Example Embodiment

Example embodiments of the present disclosure are described below with reference to the drawings.

Figure 1:
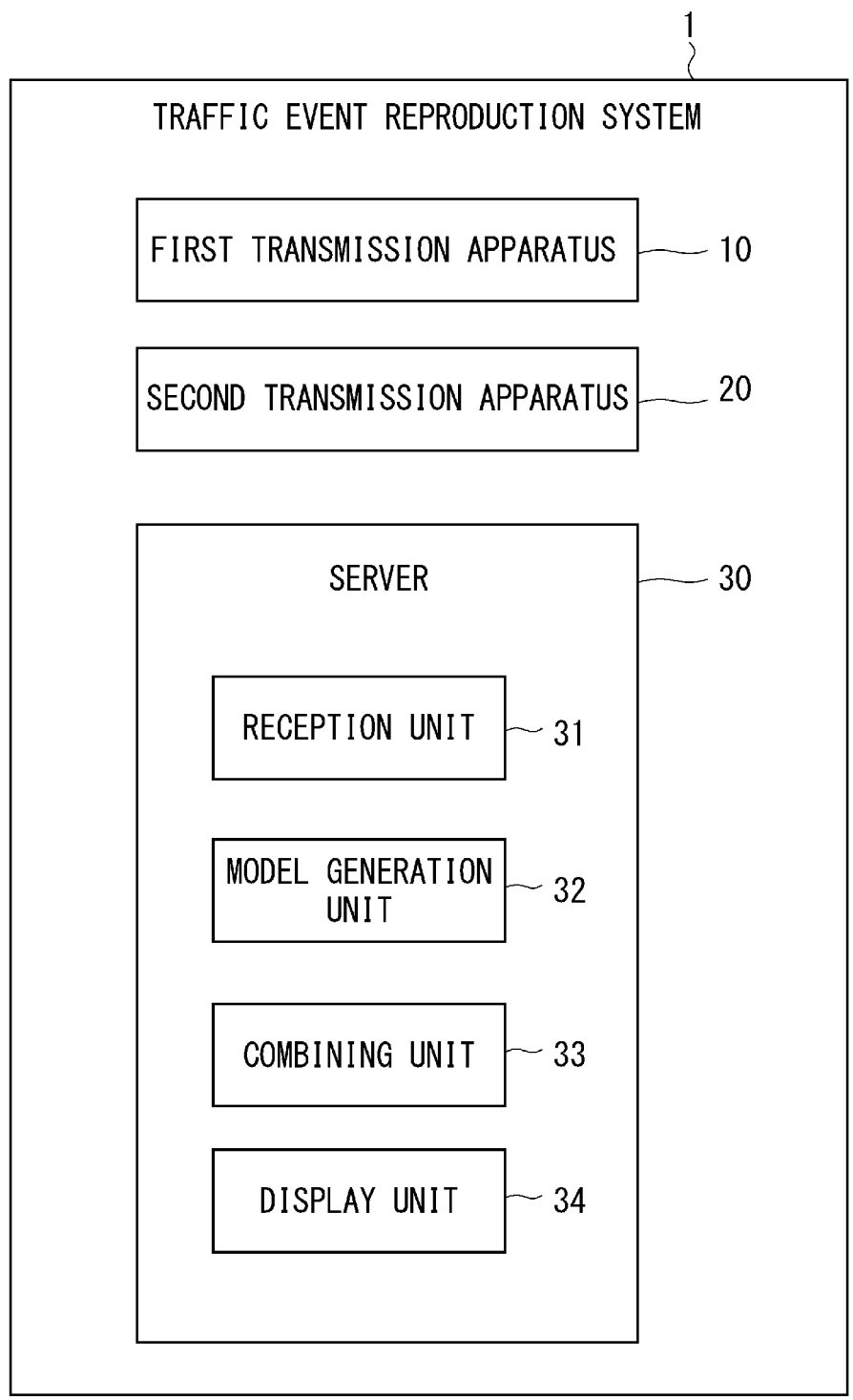
FIG. 1 is a block diagram illustrating a configuration of a traffic event reproduction system according to a first example embodiment.

FIG. 1 is a block diagram illustrating a configuration of a traffic event reproduction system 1 according to the present example embodiment. In the present example embodiment, the traffic event includes various events that occur in traffic. The traffic event may include events such as traffic accidents, as well as events that do not actually result in a traffic accident but are likely to result in a traffic accident.

As illustrated in the figure, the traffic event reproduction system 1 includes a first transmission apparatus 10, a second transmission apparatus 20, and a server 30. The server 30 further includes a reception unit 31, a model generation unit 32, a combining unit 33, and a display unit 34.

The first transmission apparatus 10 transmits first event information including a first event video of a traffic event to the server 30. The second transmission apparatus 20 transmits second event information including a second event video of the traffic event to the server 30.

The reception unit 31 receives the first and second event information from the first transmission apparatus 10 and the second transmission apparatus 20.

The model generation unit 32 generates a first three-dimensional model that includes a party to the traffic event extracted from the first event video as an object and a second three-dimensional model that includes a party extracted from the second event video as an object.

The combining unit 33 combines the first and second three-dimensional models to generate a combined three-dimensional model in a three-dimensional space including the point corresponding to the occurrence point of the traffic event.

The display unit 34 uses the generated combined three-dimensional model to display a video of the party viewed from the user-specified viewpoint.

In the traffic event reproduction system 1 according to the present example embodiment, the first and second transmission apparatuses transmit event information including the first and second event videos respectively to the server 30.

The server 30 also generates first and second three-dimensional models including the objects of the parties to the event from the received first and second event videos, respectively. Then, the server 30 combines the first and second three-dimensional models in the three-dimensional space, and displays a video of the event viewed from the viewpoint desired by the user using the combined three-dimensional model. As a result, the server 30 can reproduce the situation of the traffic event in the three-dimensional space. Therefore, according to the traffic event reproduction system 1, the user can objectively grasp the overview of the traffic event.

Second Example Embodiment

A second example embodiment is a specific example of the first example embodiment described above.

Figure 2:
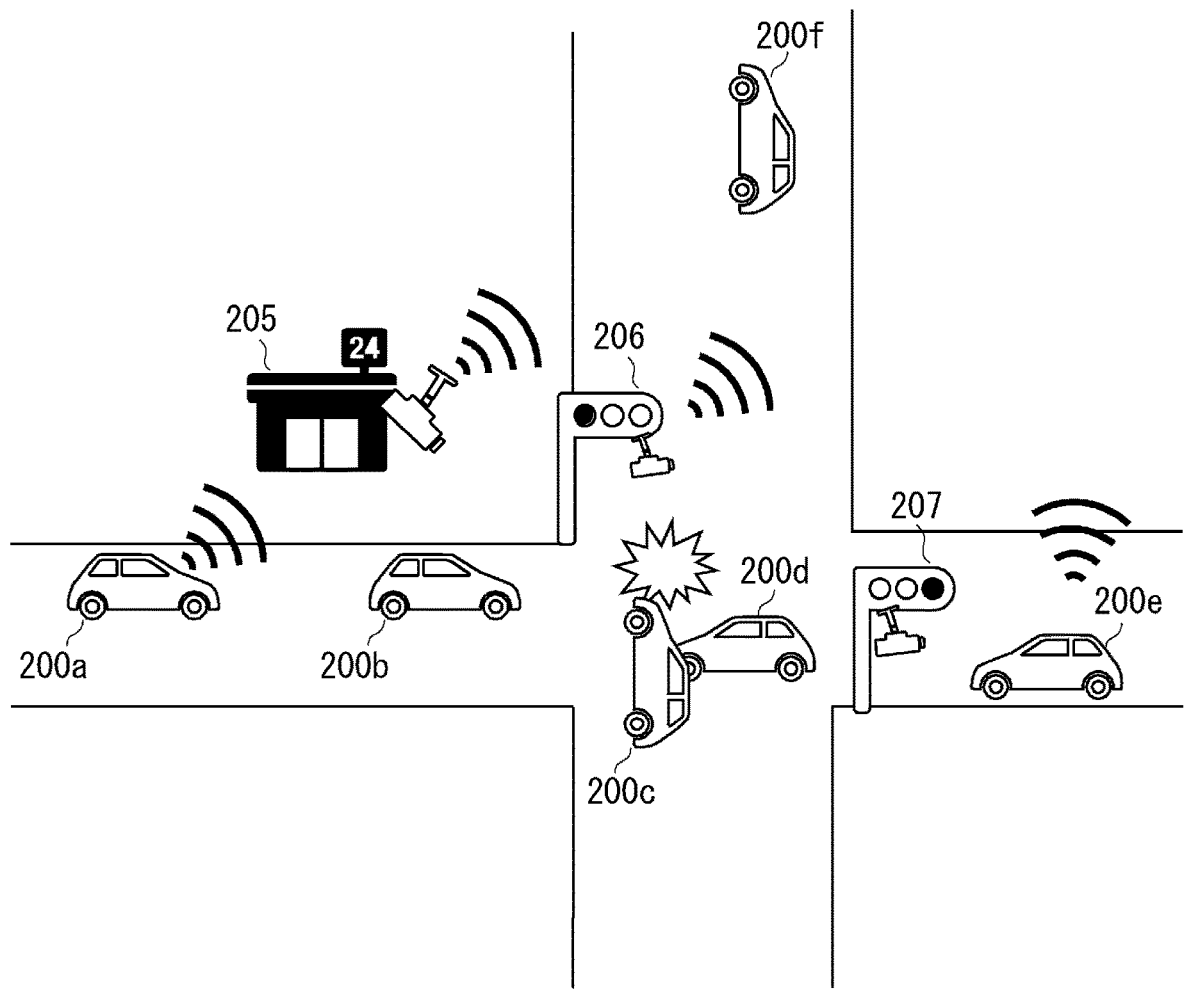
FIG. 2 is a diagram illustrating an overview of a traffic event reproduction system according to a second example embodiment.

FIG. 2 is a diagram illustrating an overview of a traffic event reproduction system according to the present example embodiment. In the present example embodiment, as illustrated in the figure, a description will be given assuming a case where a traffic event occurs due to a collision between vehicles traveling on a roadway. In the present example embodiment, the parties to a traffic event will be referred to simply as the parties. In FIG. 2, colliding vehicles 200c and 200d are the parties. The parties are not limited to vehicles such as automobiles and bicycles, and may also include people such as pedestrians. Note that, in the present example embodiment, these vehicles that are the parties may be referred to as party vehicles.

In addition, objects in the vicinity of the parties are referred to as peripheral objects. The peripheral objects include vehicles, people, road facilities, and buildings other than the parties. In the present example embodiment, among the peripheral objects, vehicles in the vicinity of the party vehicles may be referred to as peripheral vehicles. In the example of FIG. 2, vehicles 200a, 200b, 200e, and 200f are the peripheral vehicles. In addition, in the figure, a store 205, which is located near the intersection, and traffic lights 206 and 207, which are located at the intersection, are the peripheral objects.

The following is an example of the traffic event reproduction system according to the present example embodiment, in which the vehicles 200a and 200e, store 205, and traffic light 206 transmit event information to the server.

Figure 3:
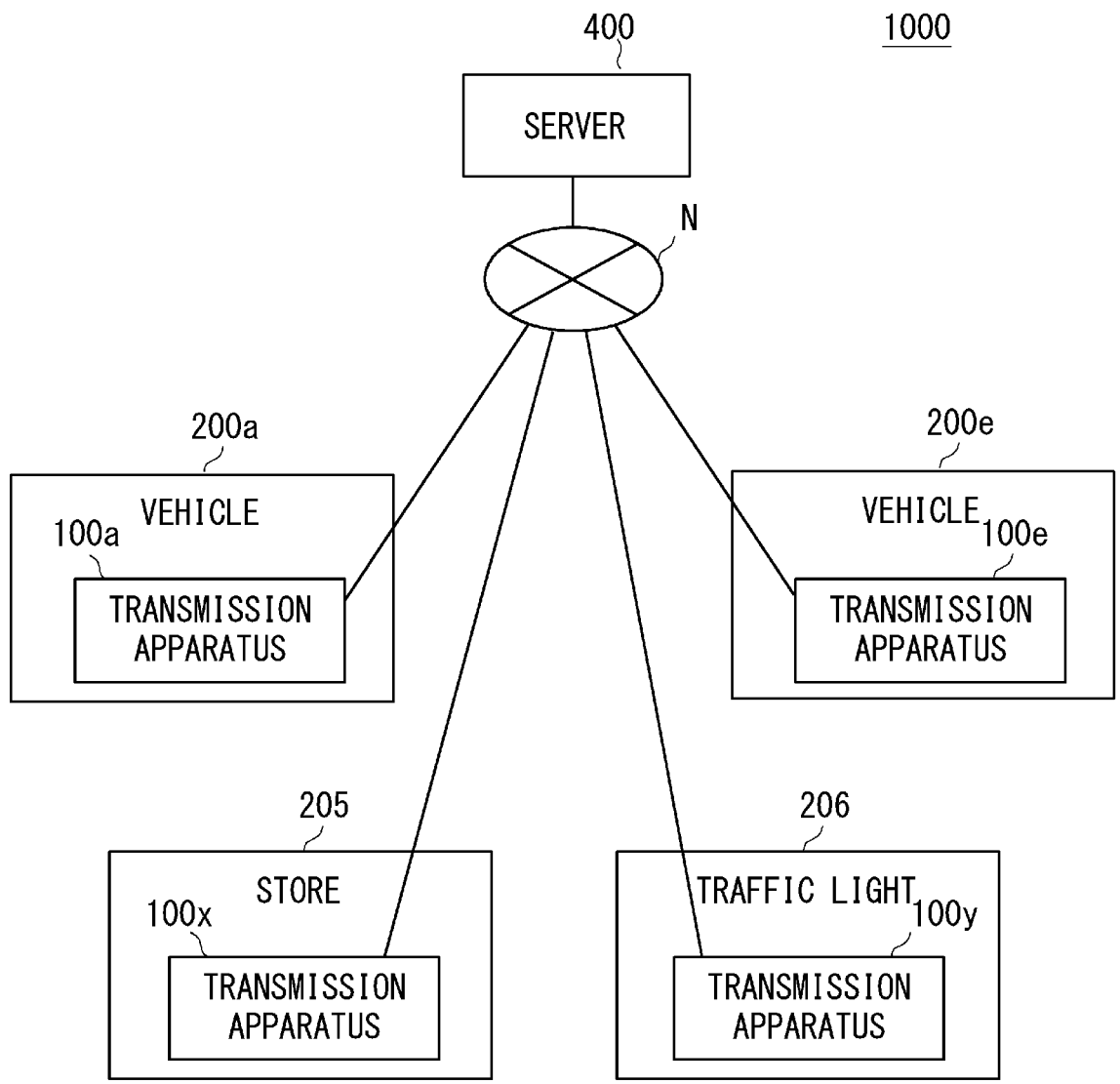
FIG. 3 is a block diagram illustrating a configuration of a traffic event reproduction system according to the second example embodiment.

FIG. 3 is a block diagram illustrating a configuration of a traffic event reproduction system 1000 according to the present example embodiment. As illustrated in the figure, the traffic event reproduction system 1000 includes a server 400, a vehicle 200a, a vehicle 200e, a store 205, and a traffic light 206. Transmission apparatuses 100a, 100e, 100x, and 100y are installed in the vehicle 200a, vehicle 200e, store 205, and traffic light 206, respectively. The transmission apparatuses 100a, 100e, 100x, and 100y are connected to a server 400 via a network N. The network N includes, for example, the Internet and a wireless communication network. The traffic event reproduction system 1000 corresponds to the traffic event reproduction system 1 of the first example embodiment illustrated in FIG. 1. The transmission apparatus 100a corresponds to the first transmission apparatus 10 of the first example embodiment illustrated in FIG. 1. The transmission apparatus 100e corresponds to the second transmission apparatus 20 of the first example embodiment illustrated in FIG. 1. Note that, in the following description, vehicles such as the vehicles 200a and 200e may also be referred to as vehicle 200 in a case where no distinction is necessary. The transmission apparatuses 100a, 100e, 100x, and 100y may also be referred to as transmission apparatus 100 in a case where no distinction is necessary.

Figure 4:
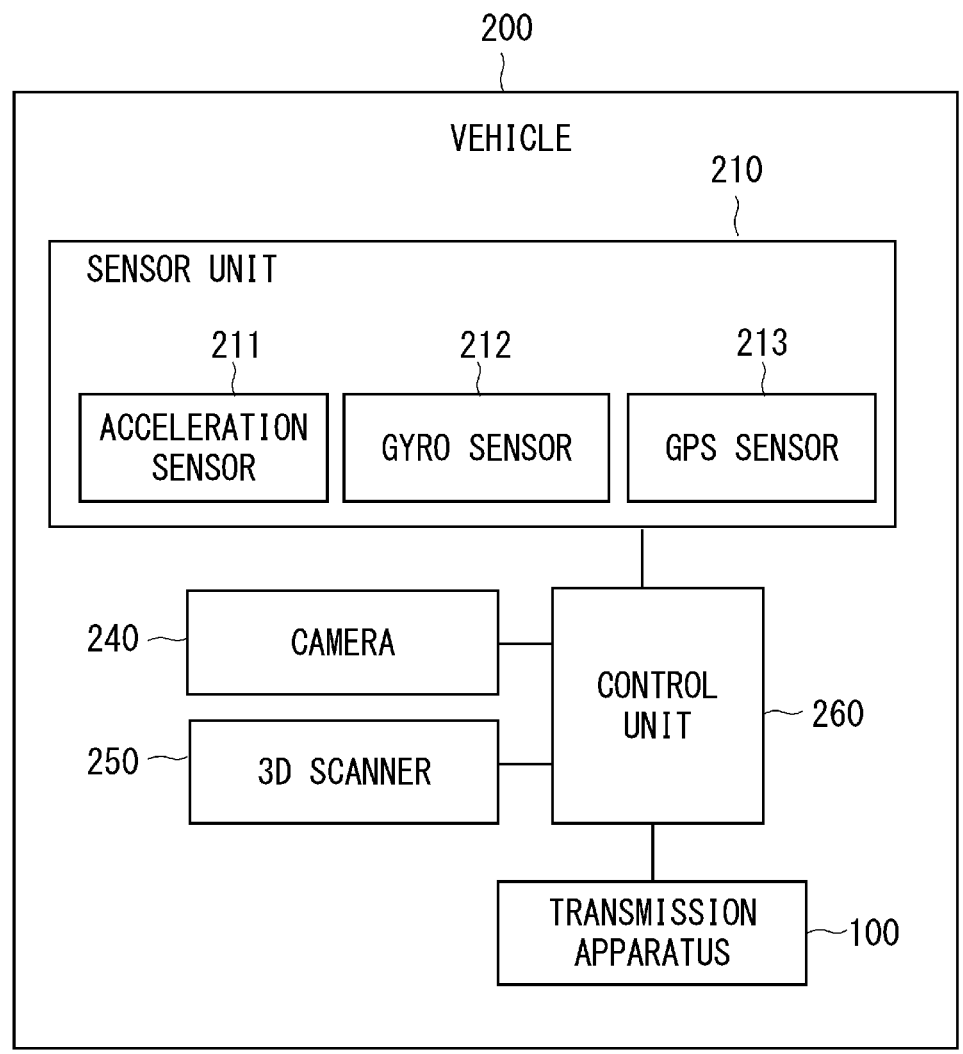
FIG. 4 is a block diagram illustrating a configuration of a vehicle according to the second example embodiment.

FIG. 4 is a block diagram illustrating a configuration of the vehicle 200. As illustrated in the figure, the vehicle 200 include a control unit 260, a sensor unit 210, a camera 240, and a 3D scanner 250, and is equipped with a transmission apparatus 100.

In the present example embodiment, the transmission apparatuses 100a and 100e (see FIG. 3) are included in the vehicles 200a and 200e, which are peripheral vehicles, respectively, but the present invention is not limited thereto. The transmission apparatuses 100 may both be installed in the party vehicles, or one of them may be installed in the peripheral vehicle.

The control unit 260 controls operations of the sensor unit 210, camera 240, 3D scanner 250, and transmission apparatus 100. The control unit 260 acquires data output from the sensors of the sensor unit 210 and stores the acquired data in a storage device (not illustrated).

The camera 240 captures a two-dimensional image in a predetermined direction from the vehicle 200, and outputs the two-dimensional camera image to the control unit 260. The camera 240 is provided at a predetermined position in the cab, for example, and captures images of the outside of the vehicle. The camera 240 includes a camera that captures images of the front of the vehicle. The camera 240 may also capture images of the right side, left side, and rear of the vehicle. Note that a plurality of cameras 240 may be installed.

The 3D scanner 250 is an apparatus that three-dimensionally scans the space outside the vehicle. The 3D scanner 250 includes, for example, LiDAR (light detection and ranging or laser imaging detection and ranging). The 3D scanner 250, for example, scans the LiDAR in all directions to acquire three-dimensional point cloud data of objects around the vehicle. The 3D scanner 250 transmits laser beams around the vehicle 200 and receives laser beams reflected by objects such as party vehicles, peripheral vehicles, or peripheral objects to detect these objects. The 3D scanner 250 acquires three-dimensional point cloud data that stereoscopically indicates the detected objects. By visualizing the three-dimensional point cloud data, a three-dimensional point cloud image of the objects around the vehicle 200 can be acquired. The 3D scanner 250 outputs the three-dimensional point cloud image to the control unit 260.

In addition to LiDAR, the 3D scanner 250 may use various cameras capable of measuring distances to objects, such as stereo cameras, time of flight (ToF) cameras, and millimeter wave radars. The 3D scanner 250 may also have the function of the camera 240 described above.

The sensor unit 210 includes various sensors installed in the vehicle 200. As illustrated in FIG. 4, the sensor unit 210 includes, for example, an acceleration sensor 211, a gyro sensor 212, and a global positioning system (GPS) sensor 213.

The acceleration sensor 211 measures acceleration in the front-rear, left-right, and vertical directions of the vehicle 200, and outputs the measured accelerations to the control unit 260.

The gyro sensor 212 measures the angular velocity of each of the pitch, roll, and yaw angles of the vehicle 200, and outputs the measured angular velocities to the control unit 260.

The acceleration sensor 211 or gyro sensor 212 acquires direction information indicating the shooting direction at the shooting position of the video acquired by camera 240 and 3D scanner 250. By acquiring the direction information, the shooting directions of the camera 240 and 3D scanner 250 can be grasped. In a case where the camera 240 captures images in all directions (360-degree direction) or in a case where the 3D scanner 250 scans all directions, the shooting direction in each case is the traveling directions of the vehicle 200. The GPS sensor 213 acquires position information of the vehicle 200 and outputs the acquired position information to the control unit 260. Specifically, the GPS sensor 213 acquires information on the absolute position (for example, latitude and longitude) of the vehicle 200 through GPS, and outputs it to the control unit 260. The position of the vehicle 200 can be regarded as the shooting position of the videos acquired by the camera 240 and 3D scanner 250.

The store 205 and traffic light 206 each include the camera 240 and 3D scanner 250, use them to acquire two-dimensional camera images and three-dimensional point cloud images, and store these acquired images in a storage device (not illustrated). Since these configurations are similar to those of the above-described vehicle 200, detailed descriptions of the store 205 and traffic light 206 are omitted.

Next, a configuration of the transmission apparatus 100 will be described. The transmission apparatus 100 corresponds to the first transmission apparatus 10 of the first example embodiment or the second transmission apparatus 20 illustrated in FIG. 1.

As illustrated in FIG. 3, the transmission apparatus 100 is installed in each of the vehicle 200a, vehicle 200e, store 205, and traffic light 206. The transmission apparatus 100 transmits event information to the server 400 via the network N. The event information is information relating to an event including an event video, which is a video that includes at least one of the parties to the event or peripheral objects, position information indicating the shooting position of the event video, and direction information indicating the shooting direction at the shooting position of the event video. The event video includes the two-dimensional camera image acquired by the camera 240 and the three-dimensional point cloud image acquired by the 3D scanner 250.

The transmission apparatus 100 detects the occurrence of an event using a method to be described later. The transmission apparatus 100 also transmits event information regarding the detected event to the server 400. For example, the transmission apparatus 100a (first transmission apparatus) transmits the first event information including the first event video to the server 400. In addition, the transmission apparatus 100e (second transmission apparatus) transmits the second event information including the second event video to the server 400.

Figure 5:
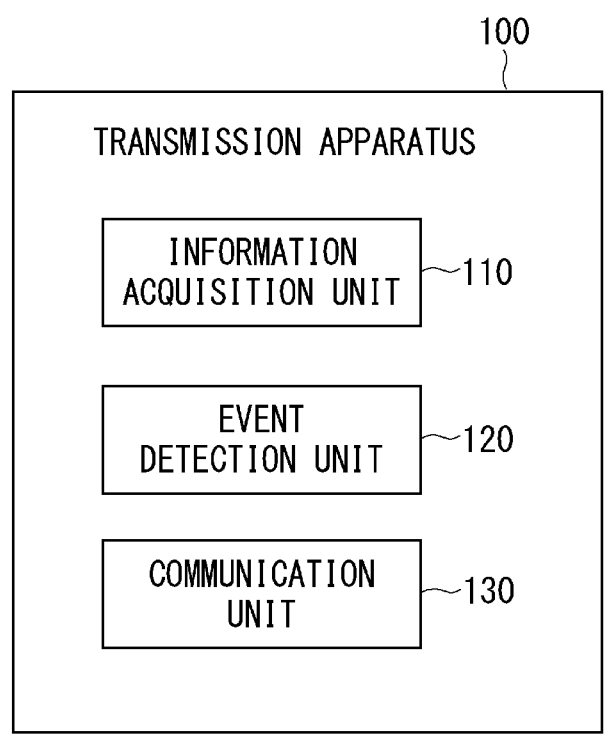
FIG. 5 is a block diagram illustrating a configuration of a transmission apparatus according to the second example embodiment.

FIG. 5 is a block diagram illustrating the configuration of the transmission apparatus 100. As illustrated in the figure, the transmission apparatus 100 includes an information acquisition unit 110, an event detection unit 120, and a communication unit 130. Note that each of the transmission apparatuses 100a, 100e, 100x, and 100y each include the configuration illustrated in the figure. The transmission apparatus 100 included in the vehicle 200a or 200e will be described below.

The information acquisition unit 110 acquires information indicating the state of the vehicle 200 from the control unit 260. For example, the information acquisition unit 110 acquires information output from an airbag (not illustrated), the acceleration sensor 211, gyro sensor 212, GPS sensor 213, camera 240, 3D scanner 250, and others installed in the vehicle 200. The information acquisition unit 110 outputs these pieces of information to the event detection unit 120.

The event detection unit 120 detects the occurrence of an event on the basis of the information acquired from the information acquisition unit 110. When the event detection unit 120 detects an event, it outputs to the communication unit 130 a statement that the event has been detected and the date and time of occurrence of the event, which is the date and time when the event has been detected.

How the event detection unit 120 detects the occurrence of an event is described below. In a case where the vehicle 200 executes an operation different from normal operation, the event detection unit 120 determines that the vehicle 200 has encountered an event and detects the event.

For example, the event detection unit 120 detects an event when an airbag activation signal is turned on. The event detection unit 120 also detects an event when sudden braking is performed in the vehicle 200. Specifically, the event detection unit 120 determines whether or not a deceleration equal to or greater than a predetermined threshold is performed per unit time using the measurement results of the acceleration sensor 211. In a case where a deceleration equal to or greater than a predetermined threshold is performed, the event detection unit 120 determines that sudden braking is performed, and detects an event.

The event detection unit 120 may also detect an event when the vehicle 200 performs a sudden acceleration. Specifically, the event detection unit 120 determines whether or not the acceleration per unit time in either the front-rear, left-right, or vertical directions of the vehicle 200 is equal to or greater than a predetermined threshold. If an acceleration equal to or greater than a predetermined threshold is made in any direction, the event detection unit 120 determines that a sudden acceleration is performed, and detects an event.

The event detection unit 120 may detect an event using the measurement results of the gyro sensor 212 instead of the acceleration sensor 211. For example, the event detection unit 120 determines that a sudden acceleration has been performed and detects an event when the angular velocity in the yaw, pitch, and roll directions per unit time exceeds a predetermined threshold.

Furthermore, the event detection unit 120 may detect an event using a learning model that has been trained with images of the scene in which an event occurred. For example, the event detection unit 120 may detect the collision scene of the vehicle from the event video captured by the camera 240 using a learning model created by learning images of collision scenes in advance. As a result, the event detection unit 120 can detect an event even when the subject vehicle is not a party to the event. For example, even in a case where other vehicles collide with each other or in a case where one other vehicle comes into contact with a peripheral facility, an event can be detected using the event video. In addition, even in a case where the transmission apparatus 100 is installed in the store 205 or traffic light 206, an event can be detected from the event video captured by these apparatuses. The above learning model is not limited to learning collision scenes, but may also learn images containing scenes that do not result in a collision but are likely to result in a collision (for example, near misses).

Not limited to the above, the event detection unit 120 may also detect an event using other sensors (not illustrated). The event detection unit 120 may also detect an event by receiving, for example, a signal notifying the occurrence of the event from other vehicles or peripheral facilities via the network N. The event detection unit 120 may also detect an event by receiving a user input from an input interface (not illustrated). As a result, for example, the driver or passenger of the vehicle 200 can cause the event detection unit 120 to detect an event. As a result, even in a case where the event detection unit 120 does not detect an event, the event information can be reliably transmitted to the server 400 when the user recognizes the risk of occurrence of an event.

In a case where the event detection unit 120 detects an event, the communication unit 130 acquires an event video or the like via the information acquisition unit 110. The communication unit 130 generates event information using the acquired information, and transmits the generated event information to the server 400.

The communication unit 130 acquires event information including event videos before and after the event occurrence date and time. For example, the communication unit 130 sets the date and time when the event detection unit 120 detected the event as the event occurrence date and time, and acquires the event videos for 30 seconds before and after the event occurrence date and time from the information acquisition unit 110. The event video includes a two-dimensional camera image and a three-dimensional point cloud image.

The communication unit 130 also acquires position information indicating the shooting position of the event video from the information acquisition unit 110. The transmission apparatus 100 is fixed to the vehicle 200 and moves integrally with the vehicle 200. Therefore, the position information of the vehicle 200 acquired by the GPS sensor 213 (see FIG. 4) can be regarded as the position information indicating the shooting position of the event video. The communication unit 130 can acquire the position information indicating the shooting position of the event video by acquiring the position information of the vehicle 200 at the time of shooting the event video from the information acquisition unit 110.

Then, the communication unit 130 acquires the direction information indicating the shooting direction at the shooting position of the event video from the information acquisition unit 110.

The communication unit 130 generates event information from the acquired event video, position information, and direction information, and transmits the generated event information to the server 400.

In this manner, the transmission apparatus 100 transmits the event information to the server 400. For example, the transmission apparatus 100a transmits the first event information to the server 400. The first event information includes a first event video, first position information, and first direction information. The transmission apparatus 100e also transmits second event information to the server 400. The second event information includes a second event video, second position information, and second direction information.

Note that the contents included in the event information and event video are not limited to the above. The communication unit 130 may transmit a part of the above to the server 400 as event information. For example, the event video may include both the two-dimensional camera image and three-dimensional point cloud image, or it may not include either one. The contents transmitted from vehicles 200a and 200e need not be identical. For example, a two-dimensional camera image and a three-dimensional point cloud image may be included in the event video in the vehicle 200a, and only a two-dimensional camera image may be included in the event video in the vehicle 200e.

The communication unit 130 may also transmit event information to the server 400 at any timing by the driver of the vehicle 200. Furthermore, the communication unit 130 may constantly transmit a video to the server 400.

The communication unit 130 may also transmit event information to the server 400 in cooperation with infrastructure such as surveillance cameras installed in the store 205, traffic light 206, or the like. For example, when the vehicle 200 detects an event occurrence, the communication unit 130 communicates with these infrastructures using vehicle-to-infrastructure (V2I) communication. The vehicle 200 that has detected the event may receive event information from these infrastructures and transmit it to the server 400, or these infrastructures may receive notification of an event occurrence from the vehicle 200 and transmit event information.

Note that, in a case where the transmission apparatus 100 is installed in a facility located at a fixed position such as the store 205 or traffic light 206, the ID (facility ID) for identifying these facilities may be regarded as the position information. Therefore, in such a case, the communication unit 130 may include the facility ID in the event information as the position information and transmit it.

Next, the configuration of the server 400 will be described. The server 400 corresponds to the server 30 of the first example embodiment illustrated in FIG. 1.

Figure 6:
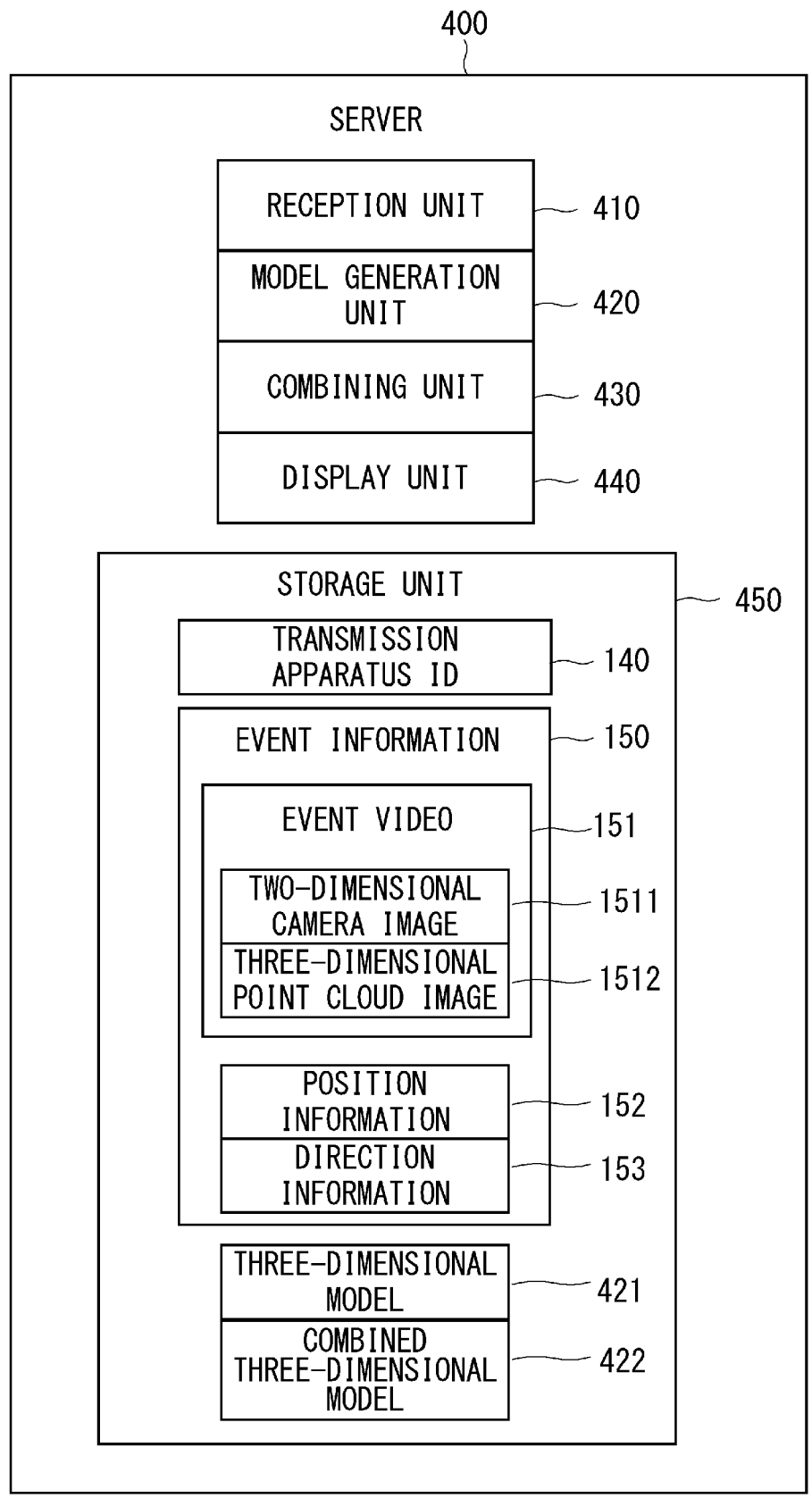
FIG. 6 is a block diagram illustrating a configuration of a server according to the second example embodiment.

FIG. 6 is a block diagram illustrating a configuration of the server 400. As illustrated in the figure, the server 400 includes a reception unit 410, a model generation unit 420, a combining unit 430, a display unit 440, and a storage unit 450. The storage unit 450 can be configured as any storage device.

The reception unit 410 corresponds to the reception unit 31 of the first example embodiment illustrated in FIG. 1. The reception unit 410 receives event information from the transmission apparatus 100. The event information received by the reception unit 410 includes the first event information transmitted from the transmission apparatus 100a and the second event information transmitted from the transmission apparatus 100e. The reception unit 410 stores the received first and second event information in the storage unit 450 as event information 150 in association with the transmission apparatus ID 140 for identifying the transmission apparatus 100. The event information 150 includes an event video 151, position information 152, and direction information 153. The event video 151, position information 152, and direction information 153 include the first event video, first position information, and first direction information included in the first event information, and the second event video, second position information, and second direction information included in the second event information, respectively The event video 151 includes at least one of a two-dimensional camera image 1511 or a three-dimensional point cloud image 1512 for each of the first and second event videos.

The model generation unit 420 corresponds to the model generation unit 32 of the first example embodiment illustrated in FIG. 1. The model generation unit 420 generates a three-dimensional model including a party extracted from an event video as an object. The model generation unit 420 generates a first three-dimensional model from the first event video included in the event information 150. The model generation unit 420 generates a second three-dimensional model from the second event video included in the event information 150. The model generation unit 420 stores the generated first and second three-dimensional models in the storage unit 450 as a three-dimensional model 421.

Extraction of the party may be automatically determined from the first and second event videos by image recognition or the like, or may be performed visually by a person. In addition, in the case of an event involving a plurality of parties, each of the first and second three-dimensional models may include three-dimensional models of the plurality of parties.

In generating a three-dimensional model, the model generation unit 420 may extract the texture of a party from the two-dimensional camera image 1511 and map the extracted texture on the three-dimensional point cloud image 1512 of the party to generate an object of the party. The model generation unit 420 generates the three-dimensional model 421 including the generated object. In generating a three-dimensional model, when an object of a party is generated using the two-dimensional camera image 1511 and three-dimensional point cloud image 1512, the three-dimensional model 421 with higher reproducibility can be generated.

The combining unit 430 corresponds to the combining unit 33 of the first example embodiment illustrated in FIG. 1. The combining unit 430 combines the first and second three-dimensional models included in the three-dimensional model 421 to generate a combined three-dimensional model 422 in a three-dimensional space including the point corresponding to the occurrence point of the event.

In the above combining, the combining unit 430 combines the first and second three-dimensional models included in the three-dimensional model 421 using the first and second position information included in the position information 152.

In combining the first and second three-dimensional models, the combining unit 430 specifies the positions of the first and second three-dimensional models in the three-dimensional space. The combining unit 430 specifies the position of the first three-dimensional model in the three-dimensional space on the basis of the first position information and the relative relationship between the shooting position indicated by the first position information and the party extracted from the first event video. In addition, the combining unit 430 specifies the position of the second three-dimensional model in the three-dimensional space on the basis of the second position information and the relative relationship between the shooting position indicated by the second position information and the party extracted from the second event video.

Figure 7:
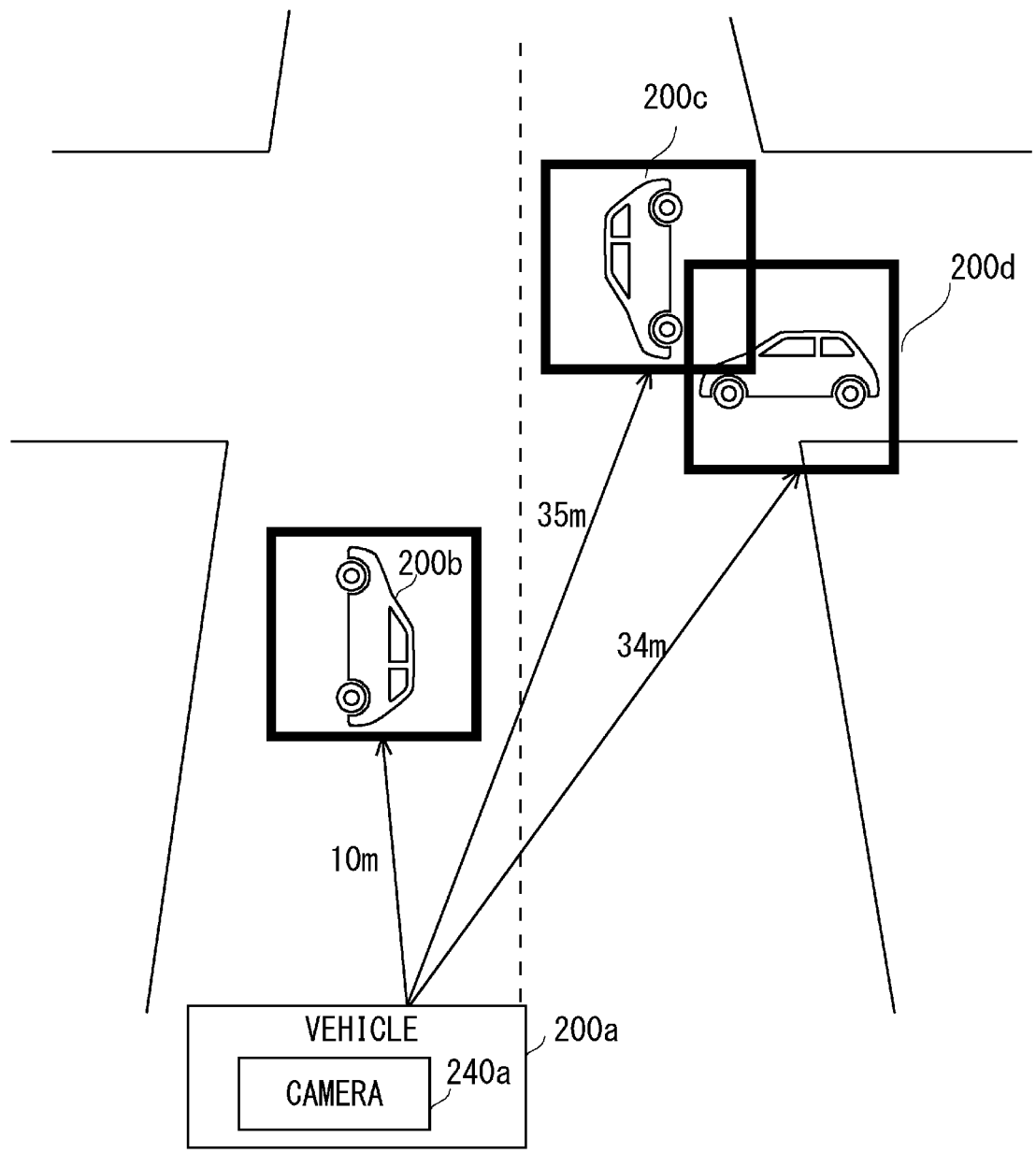
FIG. 7 is a diagram illustrating how a camera captures a site of a traffic event in the second example embodiment.

FIG. 7 is a diagram illustrating how a camera 240a installed in the vehicle 200a captures an event site. The camera 240a captures a two-dimensional camera image including the vehicles 200b to 200d in the figure. The captured two-dimensional camera image is included in the event information and transmitted to the server 400 as the first event video.

Figure 8:
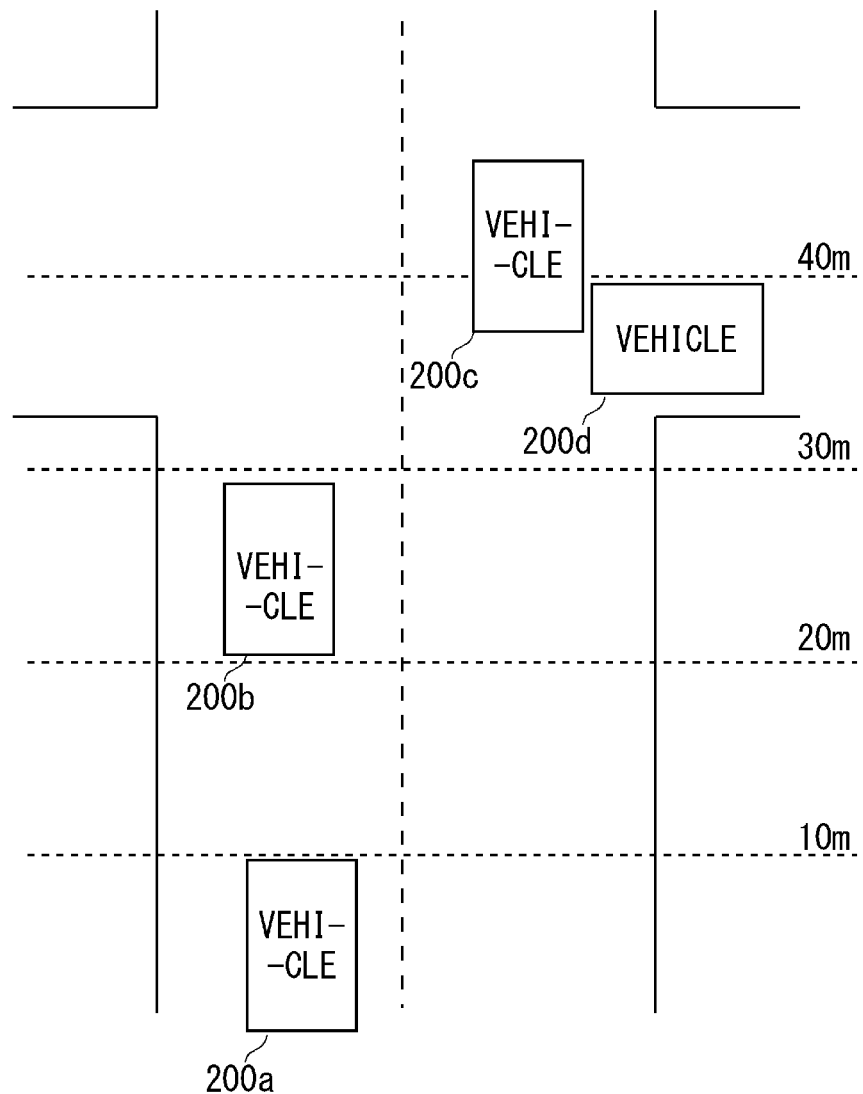
FIG. 8 is a diagram illustrating the positional relationship of vehicles calculated from an event video in the second example embodiment.

The combining unit 430 analyzes the two-dimensional camera image received from the vehicle 200a, and recognizes the vehicles 200b to 200d in the image by image recognition. The combining unit 430 calculates the distance from the vehicle 200a that captured the images to each of the vehicles 200b to 200d. As a result, as illustrated in FIG. 8, the positional relationship between the vehicle 200a and each vehicle can be calculated. The combining unit 430 specifies the position of the first three-dimensional model in the three-dimensional space on the basis of the position information (shooting position) of the vehicle 200a and the calculated positional relationship.

Note that the combining unit 430 may calculate not only the distance to the vehicles 200c to 200d, but also the positional relationship between the peripheral object and the vehicle 200a. Alternatively, the combining unit 430 may calculate the above-described positional relationship using a three-dimensional point cloud image instead of the two-dimensional camera image.

The combining unit 430 also performs image analysis on the two-dimensional camera image captured by the camera 240 included in the vehicle 200e in the same manner as described above. The combining unit 430 calculates the positional relationship between the vehicle 200e and a vehicle or a peripheral object appearing in the image by the camera 240 included in the vehicle 200e. The combining unit 430 specifies the position of the second three-dimensional model in the three-dimensional space on the basis of the calculation result and position information of the vehicle 200e.

Returning to FIG. 6, the description will be continued. In combining the first and second three-dimensional models, the combining unit 430 combines the first and second three-dimensional models using the first and second direction information included in the direction information 153. This allows the combining unit 430 to appropriately specify the directions of the first and second three-dimensional models and execute combining with higher accuracy.

The combining unit 430 combines the first and second three-dimensional models on the basis of the positions and orientations of the first and second three-dimensional models specified as described above, and generates a combined three-dimensional model 422.

Due to GPS positioning errors or the like, the first and second position information and the positions of the first and second three-dimensional models specified on the basis of them may differ from the actual positions. Therefore, in combining the first and second three-dimensional models, the combining unit 430 corrects the positions and directions of the specified first and second three-dimensional models as appropriate to generate the combined three-dimensional model 422. For example, it is assumed that coordinate values indicating the point A1 are different between the first and second three-dimensional models. For example, the combining unit 430 calculates the intermediate point between the point A1 in the first three-dimensional model and the point A1 in the second three-dimensional model, and corrects the specified positions so that the calculated intermediate point becomes the point A1 in the first and second three-dimensional models. As a result, the positions of a plurality of three-dimensional models can be specified accurately.

The combining unit 430 may map the first and second three-dimensional models onto a three-dimensional map to combine them into a three-dimensional model, thereby generating the combined three-dimensional model 422. In addition, the combining unit 430 may generate the combined three-dimensional model 422 by reproducing peripheral objects with higher accuracy using a map such as a dynamic map. The combining unit 430 may also use artificial intelligence (AI) to supplement the missing parts in the combined three-dimensional model 422 as appropriate.

The display unit 440 corresponds to the display unit 34 of the first example embodiment illustrated in FIG. 1. The display unit 440 displays a combined video from the user-specified viewpoint using the generated combined three-dimensional model 422.

The display unit 440 includes, for example, a display apparatus such as a liquid crystal display or an organic EL display. The display unit 440 receives user input from keyboard, mouse, and other input interfaces (not illustrated). The display unit 440 displays the combined video from different viewpoints on the three-dimensional space according to the input content. The display unit 440 may be, for example, a touch panel that integrates an input interface and a display apparatus.

As a result of this, the user can, for example, rotate the combined three-dimensional model 422 up and down, left and right, and observe the combined video. As a result, the user can objectively grasp the situation of the event.

Figure 9:
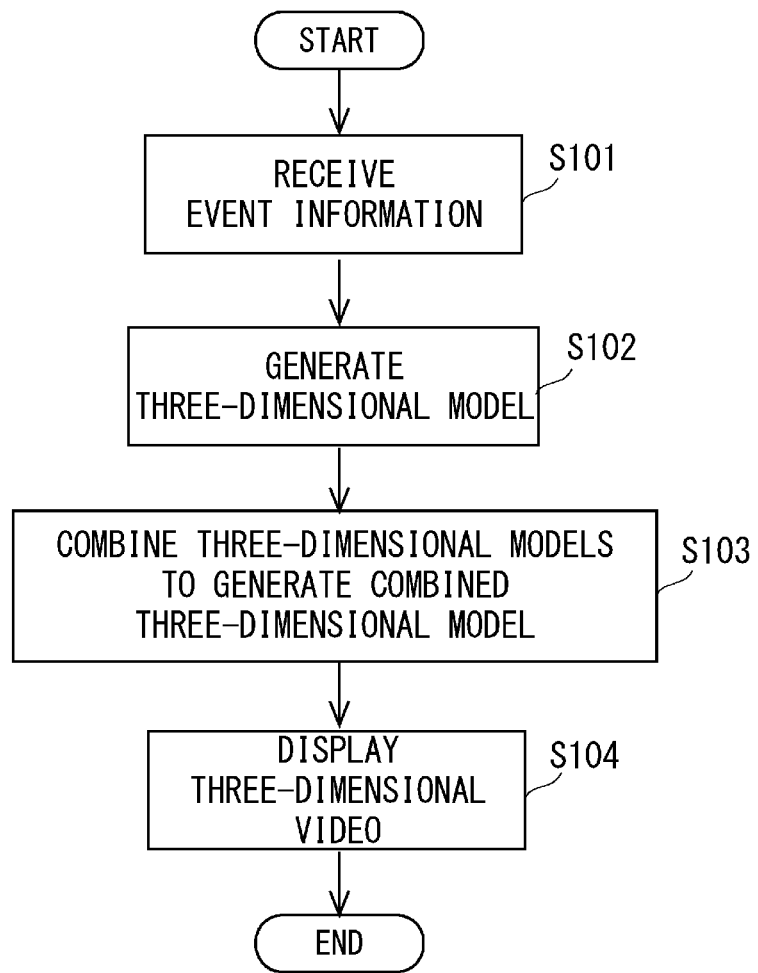
FIG. 9 is a flowchart illustrating a process executed by a server according to the second example embodiment.

Next, processing executed by the server 400 will be described with reference to a flowchart illustrated in FIG. 9.

First, the reception unit 410 (see FIG. 6) of the server 400 receives the event information (S101). For example, the reception unit 410 receives first event information including the first event video, first position information, and first direction information transmitted from the transmission apparatus 100*a* of the vehicle 200*a* (see FIG. 3). The reception unit 410 also receives second event information including the second event video, second position information, and second direction information transmitted from the transmission apparatus 100*e* of the vehicle 200*e*.

Next, the model generation unit 420 generates a three-dimensional model (S102). For example, the model generation unit 420 extracts the objects of the parties from the first event video, and generates a first three-dimensional model including them. The model generation unit 420 also extracts the objects of the parties from the second event video, and generates a second three-dimensional model including them.

Subsequently, the combining unit 430 combines the first and second three-dimensional models to generate a combined three-dimensional model (S103). For example, the combining unit 430 combines the first and second three-dimensional models to generate a combined three-dimensional model using the first and second position information in a three-dimensional space including the point corresponding to the occurrence point of the event.

Then, the display unit 440 displays the three-dimensional video (S104). For example, the display unit 440 displays a combined video from the user-specified viewpoint using the generated combined three-dimensional model. This allows the user to, for example, rotate the combined three-dimensional model up and down, left and right, and observe the combined video.

As described above, in the traffic event reproduction system 1000 according to the present example embodiment, the transmission apparatuses 100*a* and 100*e* transmit first and second event information including the first and second event videos respectively to the server 400.

The server 400 also generates first and second three-dimensional models including the objects of the parties to the event from the received first and second event videos, respectively. Then, the server 400 combines the first and second three-dimensional models in the three-dimensional space, and displays a video of the event viewed from the viewpoint desired by the user using the combined three-dimensional model. As a result, the server 400 can reproduce the situation of the traffic event in the three-dimensional space. Therefore, according to the traffic event reproduction system 1000, the user can objectively grasp the overview of a traffic event and can use the generated three-dimensional videos as objective evidence to be submitted to judicial authorities, police authorities, insurance companies, and the like. This allows, for example, an appropriate determination of the percentage of responsibility for the traffic event. Thus, the time required to process insurance payments for the traffic event can be shortened, and appropriate judicial decisions can be made regarding the presence or absence of negligence and damages.

Configuration Example of Hardware

The functional components of the server 400 and others may be realized by hardware (for example, a hard-wired electronic circuit or the like) that realizes the functional components, or by a combination of hardware and software (for example, a combination of an electronic circuit and a program that controls the electronic circuit or the like). Hereinafter, a case where each functional component of the server 400 and others is realized by a combination of hardware and software will be further described.

Figure 10:
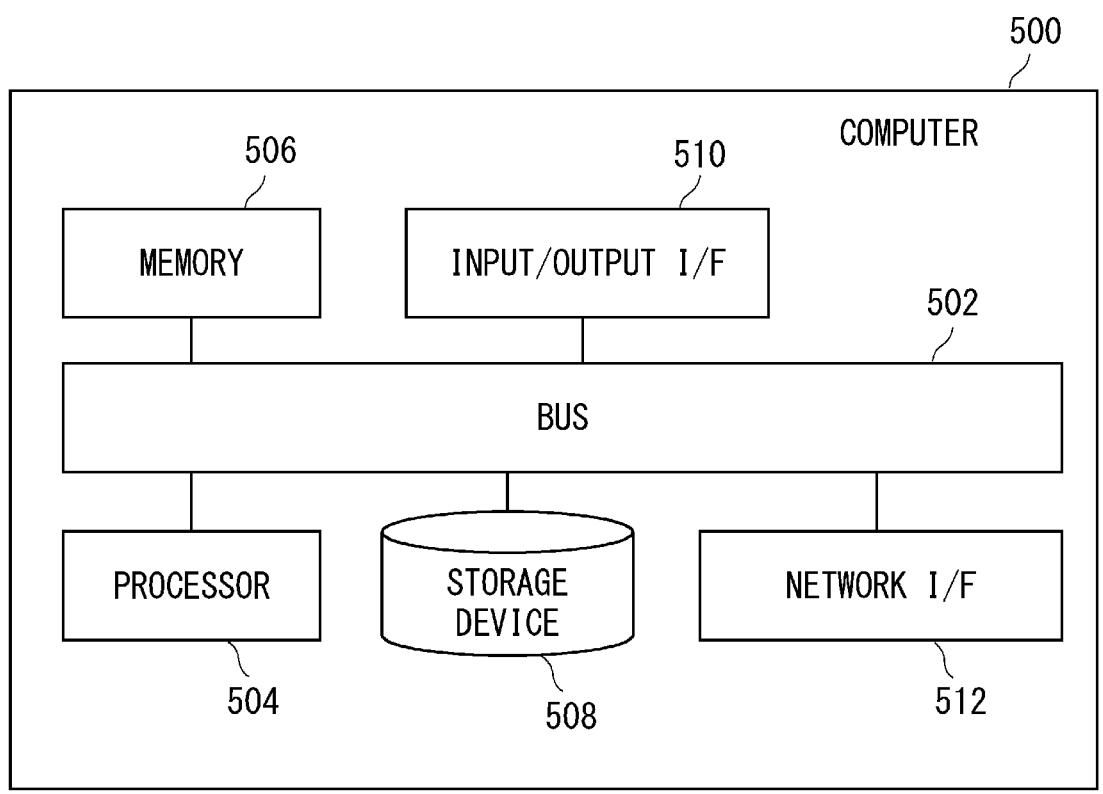
FIG. 10 is a diagram illustrating a configuration example of hardware such as a server according to the second example embodiment.

FIG. 10 is a block diagram illustrating a hardware configuration of a computer 500 that realizes the server 400 and others. The computer 500 may be a portable computer such as a smartphone or a tablet terminal. The computer 500 may be a dedicated computer designed to realize the server 400 and others, or may be a general-purpose computer.

For example, by installing predetermined applications in the computer 500, the functions of the server 400 and others are realized in the computer 500. The applications are composed of programs for realizing the functional components of the server 400 and others.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and others to each other is not limited to the bus connection.

The processor 504 is a variety of processors such as a central processing unit (CPU), a graphics processing unit (GPU), or a field-programmable gate array (FPGA). The memory 506 is a main storage device realized by using a random access memory (RAM) or the like. The storage device 508 is an auxiliary storage device realized by using a hard disk, a solid state drive (SSD), a memory card, read only memory (ROM), or the like. At least one of the memory 506 or the storage device 508 can be used as the storage unit 450 (see FIG. 6).

The input/output interface 510 is an interface for connecting the computer 500 and an input/output apparatus. For example, an input apparatus such as a keyboard and an output apparatus such as a display apparatus are connected to the input/output interface 510.

The network interface 512 is an interface for connecting the computer 500 to a network. The network may be a local area network (LAN) or a wide area network (WAN).

The storage device 508 stores programs (programs for realizing the above-described applications) for realizing the functional components of the server 400 and others. The processor 504 reads this program into the memory 506 and executes it to realize the functional components of the server 400 and others.

Note that the present disclosure is not limited to the above example embodiments, and can be appropriately changed without departing from the gist.

For example, the present disclosure can be utilized not only as objective evidence for traffic events, but also as simulation reproduction in vehicle testing. By accumulating the three-dimensional videos generated by the traffic event reproduction system 1000, the user can simulate a traffic event by changing parameters in a three-dimensional space. For example, the user can simulate traffic events under different conditions in a three-dimensional space by changing parameters such as the speed of the vehicle 200 or the position of a collision with another vehicle. Accident tests in the real world can only be tried a limited number of times, but by performing these tests in a three-dimensional space, they can be tried an unlimited number of times. This will increase the number of accident test trials and lead to new insights into product development, which can be used to develop more value-added and advanced safety technologies.

Note that, in the above-described examples, the program can be stored and provided to a computer using any type of non-transitory computer readable media. Non-transitory computer readable media include any type of tangible storage media. Examples of non-transitory computer readable media include magnetic storage media (for example, floppy disks, magnetic tapes, and hard disk drives), optical magnetic storage media (for example, magneto-optical disks, optical disk media such as compact disc (CD) and digital versatile disks (DVD), and semiconductor memories (for example, mask ROM, programmable ROM (PROM), erasable PROM (EPROM), flash ROM, and RAM). In addition, programs may be provided to computers by various types of transitory computer readable media. Examples of the transitory computer readable media include electric signals, optical signals, and electromagnetic waves. The transitory computer readable media can supply programs to computers via wired or wireless communication paths, such as wires and optical fiber.

Some or all of the above-described example embodiments may be described as the following supplementary notes, but are not limited to the following.

(Supplementary Note 1)

A traffic event reproduction system including:
a server;
a first transmission apparatus configured to transmit first event information including a first event video of a traffic event to the server; and
a second transmission apparatus configured to transmit second event information including a second event video of the traffic event to the server,
the server including:
reception means for receiving the first event information and the second event information from the first transmission apparatus and the second transmission apparatus;
model generation means for generating a first three-dimensional model including a party to the traffic event extracted from the first event video as an object and a second three-dimensional model including the party extracted from the second event video as an object;
combining means for combining the first three-dimensional model and the second three-dimensional model to generate a combined three-dimensional model in a three-dimensional space including a point corresponding to the occurrence point of the traffic event; and
display means for displaying a video of the party viewed from a user-specified viewpoint using the combined three-dimensional model.

(Supplementary Note 2)

The traffic event reproduction system according to Supplementary note 1, in which
the first event information further includes first position information indicating the shooting position of the first event video, and the second event information further includes second position information indicating the shooting position of the second event video, and
the combining means combines the first three-dimensional model and the second three-dimensional model using the first position information and the second position information.

(Supplementary Note 3)

The traffic event reproduction system according to Supplementary note 2, in which
in combining the first three-dimensional model and the second three-dimensional model, the combining means
specifies the position of the first three-dimensional model in the three-dimensional space on the basis of the first position information and the relative relationship between the shooting position indicated by the first position information and the party extracted from the first event video, and
specifies the position of the second three-dimensional model in the three-dimensional space on the basis of the second position information and the relative relationship between the shooting position indicated by the second position information and the party extracted from the second event video.

(Supplementary Note 4)

The traffic event reproduction system according to Supplementary note 2 or 3, in which
the first event information further includes first direction information indicating the shooting direction at the shooting position of the first event video, and
the second event information further includes second direction information indicating the shooting direction at the shooting position of the second event video, and
in combining the first three-dimensional model and the second three-dimensional model, the combining means combines the first three-dimensional model and the second three-dimensional model using the first direction information and the second direction information.

(Supplementary Note 5)

The traffic event reproduction system according to any one of Supplementary notes 1 to 4, in which at least one of the first and second event videos further includes a three-dimensional point cloud image.

(Supplementary Note 6)

The traffic event reproduction system according to any one of Supplementary notes 1 to 4, in which at least one of the first and second event videos further includes a two-dimensional camera image and a three-dimensional point cloud image.

(Supplementary Note 7)

The traffic event reproduction system according to Supplementary note 6, in which the model generation means extracts a texture of the party from the two-dimensional camera image, generates an object of the party by mapping the extracted texture onto the three-dimensional point cloud image, and generates the first three-dimensional model and/or the second three-dimensional model including the generated object.

(Supplementary Note 8)

The traffic event reproduction system according to any one of Supplementary notes 1 to 7, in which the first and second transmission apparatuses are respectively installed in at least one of a vehicle of the party or a vehicle in the vicinity of the party.

(Supplementary Note 9)

A server including:
reception means for receiving first event information including a first event video of a traffic event from a first transmission apparatus, and receiving second event information including a second event video from a second transmission apparatus;
model generation means for generating a first three-dimensional model including a party to the traffic event extracted from the first event video as an object and a second three-dimensional model including the party extracted from the second event video as an object;

combining means for combining the first three-dimensional model and the second three-dimensional model to generate a combined three-dimensional model in a three-dimensional space including a point corresponding to the occurrence point of the traffic event; and display means for displaying a video of the party viewed from a user-specified viewpoint using the combined three-dimensional model.

(Supplementary Note 10)

The server according to Supplementary note 9, in which the first event information further includes first position information indicating the shooting position of the first event video, and the second event information further includes second position information indicating the shooting position of the second event video, and the combining means combines the first three-dimensional model and the second three-dimensional model using the first position information and the second position information.

(Supplementary Note 11)

A traffic event reproduction method including:

receiving first event information including a first event video of a traffic event from a first transmission apparatus, and receiving second event information including a second event video from a second transmission apparatus;

generating a first three-dimensional model including a party to the traffic event extracted from the first event video as an object and a second three-dimensional model including the party extracted from the second event video as an object;

combining the first three-dimensional model and the second three-dimensional model to generate a combined three-dimensional model in a three-dimensional space including a point corresponding to the occurrence point of the traffic event; and displaying a video of the party viewed from a user-specified viewpoint using the combined three-dimensional model.

(Supplementary Note 12)

A non-transitory computer readable medium storing a traffic event reproduction program that causes a computer to execute:

a reception process of receiving first event information including a first event video of a traffic event from a first transmission apparatus, and receiving second event information including a second event video from a second transmission apparatus;

a model generation process of generating a first three-dimensional model including a party to the traffic event extracted from the first event video as an object and a second three-dimensional model including the party extracted from the second event video as an object;

a combining process of combining the first three-dimensional model and the second three-dimensional model to generate a combined three-dimensional model in a three-dimensional space including a point corresponding to the occurrence point of the traffic event; and a display process of displaying a video of the party viewed from a user-specified viewpoint using the combined three-dimensional model.

REFERENCE SIGNS LIST

1 TRAFFIC EVENT REPRODUCTION SYSTEM
10 FIRST TRANSMISSION APPARATUS
20 SECOND TRANSMISSION APPARATUS
30 SERVER
31 RECEPTION UNIT
32 MODEL GENERATION UNIT
33 COMBINING UNIT
34 DISPLAY UNIT
100, 100a, 100e, 100x, 100y TRANSMISSION APPARATUS
110 INFORMATION ACQUISITION UNIT
120 EVENT DETECTION UNIT
130 COMMUNICATION UNIT
140 TRANSMISSION APPARATUS ID
150 EVENT INFORMATION
151 EVENT VIDEO
152 POSITION INFORMATION
153 DIRECTION INFORMATION
200, 200a to 200f VEHICLE
205 STORE
206, 207 TRAFFIC LIGHT
210 SENSOR UNIT
211 ACCELERATION SENSOR
212 GYRO SENSOR
213 GPS SENSOR
240, 240a CAMERA
250 3D SCANNER
260 CONTROL UNIT
400 SERVER
410 RECEPTION UNIT
420 MODEL GENERATION UNIT
421 THREE-DIMENSIONAL MODEL
422 COMBINED THREE-DIMENSIONAL MODEL
430 COMBINING UNIT
440 DISPLAY UNIT
450 STORAGE UNIT
500 COMPUTER
502 BUS
504 PROCESSOR
506 MEMORY
508 STORAGE DEVICE
510 INPUT/OUTPUT INTERFACE
512 NETWORK INTERFACE
1000 TRAFFIC EVENT REPRODUCTION SYSTEM
1511 TWO-DIMENSIONAL CAMERA IMAGE
1512 THREE-DIMENSIONAL POINT CLOUD IMAGE
N NETWORK

What is claimed is:

1. A traffic event reproduction system comprising:

a server;

a first transmission apparatus configured to transmit first event information including a first event video of a traffic event to the server; and a second transmission apparatus configured to transmit second event information including a second event video of the traffic event to the server, the server including:

at least one memory storing instructions, and at least one processor configured to execute the instructions to:

receive the first event information and the second event information from the first transmission apparatus and the second transmission apparatus;

generate a first three-dimensional model including an object of a party to the traffic event extracted from the first event video and a second three-dimensional model including an object of the party extracted from the second event video;

combine the first three-dimensional model and the second three-dimensional model to generate a combined three-dimensional model in a three-dimensional space including a point corresponding to the occurrence point of the traffic event; and display a video of the party viewed from a user-specified viewpoint on a display using the combined three-dimensional model.

2. The traffic event reproduction system according to claim 1, wherein the first event information further includes first position information indicating the shooting position of the first event video, and the second event information further includes second position information indicating the shooting position of the second event video, and the at least one processor is further configured to execute the instructions to combine the first three-dimensional model and the second three-dimensional model using the first position information and the second position information.

3. The traffic event reproduction system according to claim 2, wherein in combining the first three-dimensional model and the second three-dimensional model, the at least one processor is further configured to execute the instructions to specify the position of the first three-dimensional model in the three-dimensional space on a basis of the first position information and the relative relationship between the shooting position indicated by the first position information and the party extracted from the first event video, and specify the position of the second three-dimensional model in the three-dimensional space on a basis of the second position information and the relative relationship between the shooting position indicated by the second position information and the party extracted from the second event video.

4. The traffic event reproduction system according to claim 2, wherein the first event information further includes first direction information indicating the shooting direction at the shooting position of the first event image, and the second event information further includes second direction information indicating the shooting direction at the shooting position of the second event video, and in combining the first three-dimensional model and the second three-dimensional model, the at least one processor is further configured to execute the instructions to combine the first three-dimensional model and the second three-dimensional model using the first direction information and the second direction information.

5. The traffic event reproduction system according to claim 1, wherein at least one of the first and second event videos further includes a three-dimensional point cloud image.

6. The traffic event reproduction system according to claim 1, wherein at least one of the first and second event videos further includes a two-dimensional camera image and a three-dimensional point cloud image.

7. The traffic event reproduction system according to claim 6, wherein the at least one processor is further configured to execute the instructions to extract a texture of the party from the two-dimensional camera image, generate an object of the party by mapping the extracted texture onto the three-dimensional point cloud image, and generate the first three-dimensional model and/or the second three-dimensional model including the generated object.

8. The traffic event reproduction system according to claim 1, wherein the first and second transmission apparatuses are respectively installed in at least one of a vehicle of the party or a vehicle in the vicinity of the party.

9. A server comprising:

at least one memory storing instructions, and at least one processor configured to execute the instructions to:

receive first event information including a first event video of a traffic event from a first transmission apparatus, and receive second event information including a second event video of the traffic event from a second transmission apparatus;

generate a first three-dimensional model including an object of a party to the traffic event extracted from the first event video and a second three-dimensional model including an object of the party extracted from the second event video;

combine the first three-dimensional model and the second three-dimensional model to generate a combined three-dimensional model in a three-dimensional space including a point corresponding to the occurrence point of the traffic event; and display a video of the party viewed from a user-specified viewpoint on a display using the combined three-dimensional model.

10. The server according to claim 9, wherein the first event information further includes first position information indicating the shooting position of the first event video, and the second event information further includes second position information indicating the shooting position of the second event video, and the at least one processor is further configured to execute the instructions to combine the first three-dimensional model and the second three-dimensional model using the first position information and the second position information.

11. A traffic event reproduction method comprising:

receiving first event information including a first event video of a traffic event from a first transmission apparatus, and receiving second event information including a second event video of the traffic event from a second transmission apparatus;

generating a first three-dimensional model including an object of a party to the traffic event extracted from the first event video and a second three-dimensional model including an object of the party extracted from the second event video;

combining the first three-dimensional model and the second three-dimensional model to generate a combined three-dimensional model in a three-dimensional space including a point corresponding to the occurrence point of the traffic event; and displaying a video of the party viewed from a user-specified viewpoint on a display using the combined three-dimensional model.

* * * * *